United States Patent Office 3,296,805
Patented Jan. 10, 1967

3,296,805
METHOD OF STORING BUTYRALDEHYDES
Talford W. Graham, Longview, Tex., assignor to Eastman Kodak Company, Rochester, N.Y., a corporation of New Jersey
No Drawing. Filed Dec. 26, 1963, Ser. No. 333,689
6 Claims. (Cl. 61—.5)

This invention relates to the storage of butyraldehydes in underground salt cavities.

The storage of high purity liquid organic chemicals in large volume may present difficult problems if they are corrosive or unstable under normal storage conditions. Many such chemicals polymerize or decompose at elevated temperatures or pressures or in the presence of certain catalysts; others may oxidize or pick up moisture in the presence of air; and still others may be corrosive to most common materials used in the construction of storage facilities. Frequently, these properties demand the use of special alloys or other unusual materials in the construction of storage facilities, complete blanketing with inert gases to exclude air, and even the use of refrigeration equipment to keep the product cool. Even so, the quantity that can be stored and the duration of storage may be limited and necessitate costly purification operations before the material can be put to use.

In view of the high degree of reactivity of the butyraldehydes, particularly isobutyraldehyde, it was anticipated that the storage of large quantities of the butyraldehydes would present many problems to prevent their decomposition as well as to prevent the butyraldehydes from undergoing well-known reactions such as oxidation and polymerization over extended periods of storage.

I have discovered that if the butyraldehydes are injected into underground salt cavities to displace the brine solution they can be stored for long periods of time without undergoing any substantial amount of decomposition or reaction. Unexpectedly, it was found that the butyraldehydes containing a small amount of water of the order of about 1% to 5% were dehydrated by contact with rock salt and brine solution.

In view of the well-known fact that the aldehydes are among the most reactive of organic compounds, it was most unexpected that the butyraldehydes could be injected into the salt cavities and found to remain unchanged after storage for long periods of time. The butyraldehydes are known to readily undergo oxidation to form acids, yet when they are stored in the salt cavities they are found to contain an insignificant amount of acid. Similarly weak alkalis, such as alkali metal salts, are known to cause the butyraldehydes to undergo condensation. In fact, even lime water is known to cause isobutyraldehyde to undergo condensation and oxidation to the corresponding acid and alcohol. Isobutyraldehyde is also known to undergo the Cannizzaro reaction by treatment with baryta water to produce the corresponding alcohol and acid. Surprisingly, these reactions do not occur when the butyraldehydes are stored in the salt cavities. In this connection it should be noted that the literature such as U.S. Patent 2,942,424 shows that moisture and oxygen can be expected to contaminate hydrocarbons such as olefins stored in salt cavities and it has been necessary to provide a moisture barrier at the interface of the brine and the hydrocarbon. This is not necessary in the case of butyraldehydes' storage in the salt cavities and possibly such a barrier would prevent the advantageous dehydration of the butyraldehydes. Also, U.S. Patent 2,713,775 shows that salt can be dissolved by chemicals stored in the cavities which does not occur on storage of the butyraldehydes in salt cavities.

Accordingly, the storage of the butyraldehydes in the salt cavities appeared to represent a high degree of commercial risk. Unexpectedly, as mentioned, the butyraldehydes remain substantially unchanged during storage in salt cavities except that advantageously they undergo dehydration. Naturally large savings in storage costs result from the use of my invention.

In carrying out my invention the butyraldehydes are injected into a natural rock salt bed in the earth to displace brine solution filling the cavity. The cavity should contain little or no air when the aldehyde is present but the presence of inert gases such as natural gas is not objectionable. Air or any other objectionable gases can be displaced with water or preferably brine solution before or after the aldehyde has been pumped into the cavity. Ordinarily, the aldehydes per se are not used to replace air in the cavity unless the whole cavity can be filled with the aldehyde before any substantial amount of oxidation has taken place. Accordingly, since the aldehyde is maintained at a relatively uniform pressure and temperature in contact only with the salt forming the walls of the cavity and the brine filling the voids, it does not come into contact with air which would cause oxidation of the aldehyde to an acid. Contrary to normal expectations and the actual results encountered with petroleum hydrocarbons, the aldehyde does not pick up moisture but is actually dehydrated. When the aldehyde is withdrawn from the cavity it is not necessary to direct it through drying equipment, as in the case with petroleum hydrocarbons, since it then contains less moisture than when injected. The brine withdrawn from the cavity by displacement with the butyraldehydes will contain only an insignificant amount of the aldehyde unless it has been in contact with the aldehyde or originated near the interface of the two liquids. In any event, the brine will contain less than about 1% aldehyde. This brine can be segregated for future injection back into the cavity when it is desirable to withdraw aldehyde or it can be distilled to recover the aldehyde. It should be noted that cavities once used for petroleum hydrocarbons can subsequently be used for storing the aldehydes. There is no apparent contamination if the petroleum hydrocarbon is first withdrawn by displacement with brine before the aldehyde is injected into the cavity.

The following analyses of recovered aldehyde and brine solution are representative of those obtainable by storage of the butyraldehydes in the salt cavities:

| Sample | Aldehyde Recovered | | Brine Solution | |
|---|---|---|---|---|
| | Percent Acid | Percent Aldehyde | Percent Acid | Percent Aldehyde |
| 1 | 0.33 | 96.0 | 0.012 | 0.80 |
| 2 | 0.64 | 92.7 | 0.012 | 0.72 |
| 3 | 0.75 | 92.2 | 0.036 | 0.73 |

The invention has been described in considerable detail with particular reference to certain preferred embodiments thereof, but it will be understood that variations and modifications can be effected within the spirit and scope of the invention as described hereinabove, and as defined in the appended claims.

What I claim is:

1. A method for the underground storage of a butyraldehyde which comprises injecting said butyraldehyde into an underground salt cavity containing a brine solution whereby said butyraldehyde is brought into contact with said brine solution and said brine solution is displaced from said salt cavity until said salt cavity is substantially filled with said butyraldehyde and said brine solution.

2. The method according to claim 1 in which said butyraldehyde is isobutyraldehyde.

3. The method according to claim 1 in which said butyraldehyde and said brine solution are allowed to remain in contact until said butyraldehyde is substantially dehydrated.

4. The method according to claim 1 in which a gas which is inert to said butyraldehyde is also injected into said salt cavity until said salt cavity is substantially filled with said butyraldehyde, said brine solution, and said gas which is inert to said butyraldehyde.

5. The method according to claim 4 in which said butyraldehyde is isobutyraldehyde.

6. The method according to claim 4 in which said butyraldehyde and said brine solution are allowed to remain in contact until said butyraldehyde is substantially dehydrated.

References Cited by the Examiner

UNITED STATES PATENTS

| | | | |
|---|---|---|---|
| 2,942,424 | 6/1960 | Koble | 61—.5 |
| 3,151,462 | 10/1964 | Raetzsch | 61—.5 |

EARL J. WITMER, *Primary Examiner.*